D. E. CLIFFORD.
CARCASS SPLITTING MACHINE.
APPLICATION FILED AUG. 4, 1914.
1,165,389.
Patented Dec. 28, 1915.
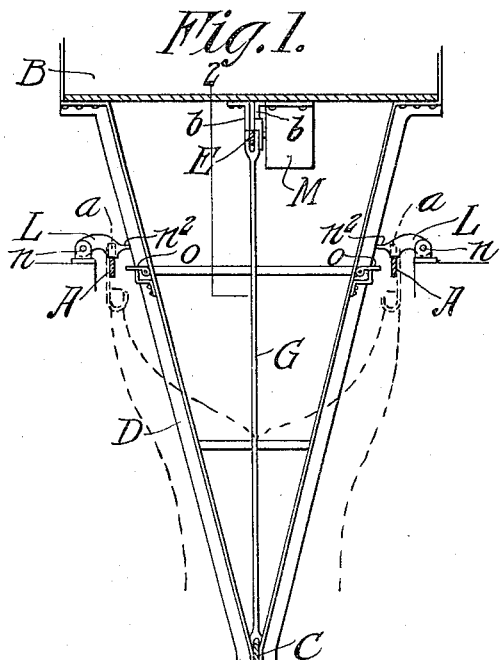
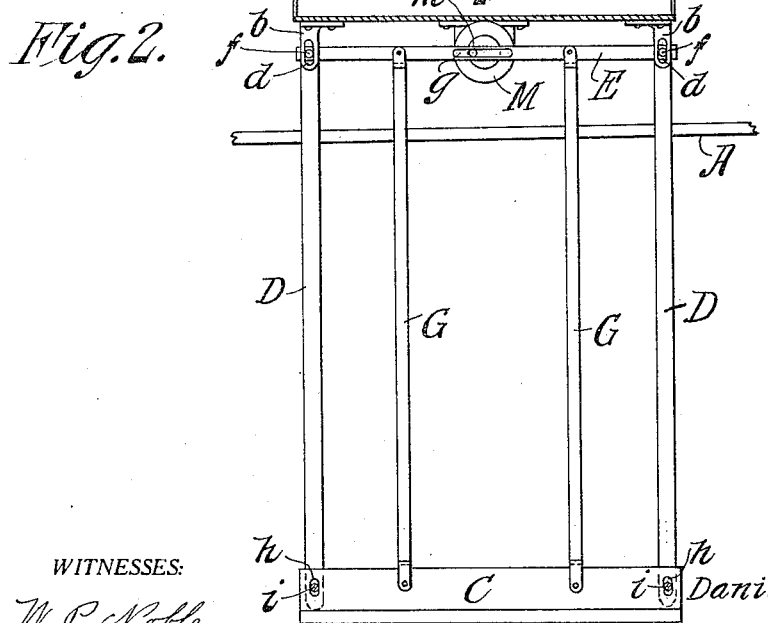
WITNESSES:
W. P. Noble.
W. E. Beach.
INVENTOR,
Daniel E. Clifford,
BY
ATTORNEY.

UNITED STATES PATENT OFFICE.

DANIEL E. CLIFFORD, OF WARE, MASSACHUSETTS.

CARCASS-SPLITTING MACHINE.

1,165,389.

Specification of Letters Patent.

Patented Dec. 28, 1915.

Application filed August 4, 1914. Serial No. 854,942.

*To all whom it may concern:*

Be it known that I, DANIEL E. CLIFFORD, a citizen of the United States of America, and resident of Ware, in the county of Hampden and State of Massachusetts, have invented certain new and useful Improvements in Carcass-Splitting Machines, of which the following is a full, clear, and exact description.

This invention relates to improvements in a machine for splitting carcasses, more particularly beeves, and pertains to a machine which comprises in combination with a trackway or other support for the carcass a vertically movable carrier having arranged and supported therebelow a blade which upon the descent of the carrier is caused to forcibly cut through the carcass along the line of the backbone.

The object of the present invention is to provide means whereby the blade which while bodily movable with its carrier also has, independently of the latter, a vibratory motion so that a chopping action is assured.

Other objects are to improve the machine and render it more convenient and available for its required utilization.

The invention is described in conjunction with the accompanying drawings and is set forth in the claims.

In the drawings: Figure 1 is a sectional elevation of the machine transversely of the trackway and the cutting blade. Fig. 2 is a sectional elevation as seen at right angles to Fig. 1 and on the plane indicated by line 2—2.

In the drawings the carcass support comprises a trackway including the double separated rails A A on which the carcass carrier may run, the same including rollers $a$ $a$ as heretofore usual and from which, by hook-like hangers, the whole beef is suspended from the hind quarters.

B represents the usual vertically movable carrier body,—sometimes termed "the elevator", and understood as having up and down movements within a suitable range and by which the cutting blade C is carried.

In the carrying out of my invention, the carrier body B is provided with downwardly convergent hanger members D D having considerable extension below the carrier B; and the said carrier B also has comparatively short intermediately located depending members $b$ $b$, formed with vertical slots $d$ therein as shown in Fig. 2.

The bar E, horizontally arranged, has, by the studs $f$ $f$ at its ends, engagements in the slots of the depending members $b$ whereby such horizontal bar E is constrained steadily for its bodily vertical movements. Said bar E, moreover, has a longitduinal slot $g$ in its middle portion.

The blade C is horizontally arranged between the approached, but slightly separated, extremities of the depending convergent members D D, said blade thereat having the vertical slots $h$ $h$ and the members having the studs $i$ $i$ in guiding engagements in said slots. Duplicated bars G G connect the horizontal bar E and the blade C.

An electric or other motor M is represented as supported by and below the carrier body B, the same having a revoluble crank pin $m$ which has engagement in the slot $g$ of the bar E, whereby under the running of the motor the bar is vertically vibrated, correspondingly vibrating the blade.

The roller carrier from which the carcass is suspended being brought along the trackway to proper position relatively to the vertically movable blade, at a time when the latter by its carrier B is elevated and restrained by the stops L L will, on the descent of the blade, be severed throughout the whole length thereof under the downward bodily movement of the blade, and greatly facilitated by the vibratory or chopping motion thereof. The aforementioned stops L L are mounted to swing on the pivots $n$ $n$ and have inward extensions $n^2$.

$o$ $o$ represent trip members so pivotally mounted as to be free to swing in upward directions only, so that they may freely pass the extensions $n^2$ of the stop members in the downward, working, action of the machine, but adapted to engage and elevate the stops, on the upward return movement, whereby to permit the onward passage of the roller provided carrier with the split portions of the carcass conveyed thereby.

I claim:—

1. A machine for splitting animal carcasses including a vertically movable carrier, a convergent frame depending from the carrier, a blade arranged between the converging ends of the frame sections, connections between the frame and blade to permit a limited vertical play of the blade with relation to the frame and means arranged wholly below the carrier and within the frame to impart vertical reciprocatory movement to the blade.

2. In a machine for splitting animal carcasses including a vertically movable carrier, a V-shaped frame depending from the carrier, a blade mounted for movement in the apex of the frame, connections between the frame and blade to permit a limited vertical movement of the blade with respect to the frame, supports depending from the carrier within the frame, a bar connected to and arranged for limited vertical movement with respect to the supports, means arranged within the frame and below the carrier for operating the bar, and a connection between said bar and blade.

3. In combination, a carcass support including a trackway and members movable on the trackway, of stops to limit movement of said members relative to the trackway, a vertically movable splitting frame, and means carried by the frame to operate the stops in the movement of the frame in one direction.

4. In combination, a trackway, carcass supporting elements adapted for travel along the trackway, stops coöperating with the trackway to limit movement of said elements thereon, a vertically movable splitting member, and trips carried by said splitting member to engage and operate the stops in movement of the splitting member in one direction.

Signed by me at Springfield, Mass., in presence of two subscribing witnesses.

DANIEL E. CLIFFORD.

Witnesses:
G. R. DRISCOLL,
J. D. LONG.